United States Patent Office 3,536,685
Patented Oct. 27, 1970

3,536,685
CARBOXYCHLORINATED POLYMERS OF UN-SATURATED ALIPHATIC OR CYCLOALI-PHATIC HYDROCARBONS AND PROCESS FOR PREPARING SAME
Franz Landauer, Frankfurt am Main, and Claus Beermann, Neu Isenburg, Germany (both % Farbwerk Hoechst AG., Frankfurt am Main, Germany)
No Drawing. Filed June 16, 1967, Ser. No. 646,454
Claims priority, application Germany, June 18, 1966,
F 49,497
Int. Cl. C08f 15/04, 19/02
U.S. Cl. 260—88.2                                    8 Claims

ABSTRACT OF THE DISCLOSURE

Process for producing carboxychlorinated polymers of unsaturated aliphatic and/or cycloaliphatic hydrocarbons by reaction with a dicarboxylic acid dichloride, phosgene or carbon monoxide and chlorine or mixtures thereof in the presence of free radical catalysts and/or under the action of radiation rich in energy and/or ultraviolet light until the carboxychlorinated polymers contain a total amount of chlorine of 10 to 60% by weight, of which 0.5 to 2% are hydrolizable chlorine.

---

The present invention relates to a process for carboxychlorinating polymers of unsaturated aliphatic or cycloaliphatic hydrocarbons.

It is known to carboxylate hydrocarbons of low molecular weight with phosgene or oxalyl chloride. The said reaction proceeds, however, very slowly with hydrocarbons having a higher number of carbon atoms, for example a hydrocarbon with about 16 carbon atoms, and the yield is very small so that it is of no interest in industry. It has also been proposed to produce halogenated high pressure polyethylenes by means of phosgene or oxalyl chloride. In this reaction products are obtained which become insoluble or practically do not contain carbonyl groups. Still further, it is known that in the reaction of polyethylene with dicarboxylic acid dichlorides cross-linked products are formed at 40–60° C.

It has now been found that polymers of unsaturated aliphatic or cycloaliphatic hydrocarbons containing halogen atoms and carboxyl chloride groups can be obtained by reacting polymers of unsaturated aliphatic and/or unsaturated cycloaliphatic hydrocarbons, in organic solvents that are inert towards chlorine, under the reaction conditions, with chlorine and simultaneously at least one agent having a carboxy-chlorinating action in the presence of free radical catalysts such as organic peroxides or azo compounds, for example bisazoisobutyronitrile, and/or under the action of radiation rich in energy, for example ultraviolet light or gamma rays. The polymers thus obtained are distinguished by a series of very valuable properties; in general they contain a total amount of chlorine of 10 to 60% by weight, of which 0.5 to 2% by weight are hydrolizable chlorine.

Polymers of unsaturated aliphatic or cycloaliphatic hydrocarbons to be used in the process of the invention are, for example, homopolymers of mono-olefins with 2 to 10 and preferably 2 to 6 carbon atoms, such as polyethylenes produced by the Ziegler process or the Phillips process described, for example, in Houben-Weyl "Methoden der organischen Chemie," volume 14/I, especially page 561 et seq., Georg Thieme Verlag Stuttgart 1961, polypropylenes, polybutenes or polypentenes, polymers of 4-methyl-pentene-1, or copolymers of said olefins or copolymers of said olefins with aliphatic or cycloaliphatic dienes with 4 to 16 and preferably 4 to 12 carbon atoms, for example, ethylene/propylene copolymers, propylene/butene-1 copolymers, ethylene/isoprene copolymers; terpolymers of ethylene/propylene/dicyclopentadiene, ethylene/propylene/butadiene, or ethylene/propylene/ethylidene-norbornene, for example a terpolymer consisting of 60 mole percent of ethylene, 37 mole percent of propylene and 3 mole percent of ethylidene-norbornene. The polymers to be reacted in the process according to the invention may be of a solid, waxy or oily nature.

To introduce the carboxylchloride group there may be used phosgene, preferably in statu nascendi when carbon monoxide is reacted with chlorine, and particularly dicarboxylic acid dichlorides. Suitable dicarboxylic acid dichlorides are those of aromatic dicarboxylic acids, preferably those having 8 to 12 carbon atoms, cycloaliphatic dicarboxylic acids, preferably those having 8 to 12 carbon atoms, araliphatic dicarboxylic acids, preferably those having 10 to 18 carbon atoms and particularly aliphatic dicarboxylic acids, preferably those having 2 to 12 carbon atoms, such as for example, terephthaloyl chloride, cyclohexane-dicarboxylic acid dichloride (1,4), p-phenylenediacetyl chloride, malonyl chloride, adipic acid dichloride and advantageously oxalyl chloride. The aforesaid carboxylating agents may, of course, also be used in admixture with one another.

The carbon chain of the dicarboxylic acid chloride can be interrupted by hetero atoms, such as oxygen or sulfur. It is thus possible to use the dichloride of diglycolic acid or thiodiglycolic acid.

In the carboxychlorination carbon tetrachloride, chlorobenzene or dichlorobenzene may be used as inert organic solvents. The reaction is carried out at atmospheric pressure or under pressure, in general at a temperature in the range of from 20 to 150° C., preferably 50 to 120° C. As the carboxychlorination is preferably carried out in homogeneous solution, the reaction temperature also depends on the polymer used. With crystalline polymers temperatures near or above 100° C. are preferred, while atactic or oily polymers can also be reacted at considerably lower temperatures, for example about 50° C. During the course of the reaction the temperatures may be raised or lowered. The process according to the invention can be varied in various ways, for example by the choice of the starting polymers, the type and amount of the carboxychlorinating agent, the incorporated amount of halogen, the course of temperature. It is thus possible to produce products having the most differing properties which are particularly suitable as raw materials for the manufacture of lacquers or as synthetic rubbers. When, for example, polyethylene having a density of 0.94 is reacted until it contains a total amount of chlorine of 30% of which 1.2% are hydrolizable chlorine, elastic products are obtained, whereas products having a total chlorine content of 40–60% and a content of hydrolizable chlorine of 1.5% are excellently suitable as raw materials for the production of lacquers. The reactive carboxylic acid chloride groups contained in the polymers enable them to undergo numerous further reactions. They can be transformed, for example, with water into the corresponding acids, with alcohols into the corresponding esters and with amines into the corresponding amides. When they are reacted with polyfunctionel compounds, cross-linked products can readily be prepared.

The following examples serve to illustrate the invention but they are not intended to limit it thereto.

EXAMPLE 1

100 grams of polyethylene having a density of 0.93 ($\eta$ spec/c.=1.65, determined with a 0.5% solution in tetrahydronaphthalene at 135° C.) were dissolved at 110–120° C. in 1.5 liters of chlorobenzene. 67 cc. of oxalyl chloride were added to the solution and nitrogen was passed through for about 10 minutes. The mixture was then exposed to the radiation of an ultraviolet lamp and chlorine was introduced for 8 hours. After 2 hours the temperature was allowed to drop gradually to 80° C. The excess of oxalyl chloride was distilled off and under reduced pressure (20 mm. of mercury) 100 to 200 cc. of chlorobenzene were distilled off until the saponification number of the distillate was zero. The dissolved HCl was blown out by means of nitrogen. The carboxychlorinated polyethylene obtained contained 1.3% of hydrolizable chlorine and a total content of chlorine of 46.9%.

After adding 10 cc. of acetone and 3 cc. of water the mixture was stirred for another 3 hours at 80° C. The polymer was precipitated by pouring the mixture into 2 to 3 liters of methanol. After drying the polymer contained 46% of chlorine and had an acid number of 18 (acid number=milligrams of KOH consumed for 1 gram of product). The yield amounted to 170 g. A limpid, tough elastic film was obtained from a solution of the polymer in benzene.

EXAMPLE 2

50 grams of an atactic ethylene/propylene copolymer ($\eta$ spec/c.=3.2, determined as defined in Example 1; containing 30 mole percent of propylene) were dissolved at 90–100° C. in 1 liter of o-dichloro-benzene. After having passed through nitrogen, carbon monoxide and 35 grams of chlorine were introduced over a period of 7 hours. During this period of time the reaction mixture was irradiated with ultraviolet light. After having passed through nitrogen the carboxylchlorinated copolymer obtained contained 0.7% of hydrolizable chlorine and 17.2% of total chlorine.

After the addition of 3 cc. of absolute ethanol and 0.1 cc. of pyridine the reaction mixture was stirred for another 3 hours at 60–70° C. The polymer was precipitated by pouring it into 2 liters of ethanol. The polymer was dissolved and reprecipitated by benzene and methanol and then dried in a vacuum cabinet at 50–60° C. 55 grams of polymer were obtained containing 16.5% of chlorine and having an ester number of 10.9 (milligrams of KOH for 1 gram of polymer). The product had the properties of a soft rubber and was soluble in aromatic and chlorinated hydrocarbons.

EXAMPLE 3

54 grams of chlorine were introduced over a period of 6 hours and while irradiating with ultraviolet light, at 50–60° C. into a mixture of 90 grams of polyethylene oil preparjed by the Ziegler process (mean molecular weight 900) and 25 cc. of oxalyl chloride. The excess of oxalyl chloride was distilled off and the remaining gaseous hydrogen chloride was blown out with nitrogen. The thick oil obtained contained 1.3% of hydrolizable chlorine and 18% of total chlorine.

EXAMPLE 4

150 grams of crystalline polypropylene ($\eta$ spec/c.=2.2, determined as defined in Example 1) were dissolved at 110° C. in 2 liters of chlorobenzene. Nitrogen was blown through the solution for about 10 minutes and then 67 cc. of oxalyl chloride were added. At a temperature of 100 to 110° C., 112 grams of chlorine were introduced over a period of 8 hours. During this period of time the reaction mixture was irradiated with ultraviolet light. After distilling off the excess of oxalyl chloride a mixture of 10 cc. of acetone and 6 cc. of water was added to the solution and the whole was stirred for another 4 hours at 70 to 80° C. The polymer was precipitated by pouring in methanol. It contained 27% of chlorine and had an acid number of 19.3 (milligrams of KOH/1 gram). When cast from a benzenic solution the hydrolyzed carboxychlorinated polypropylene yielded a limpid tear-resistant film.

EXAMPLE 5

75 grams of an amorphous ethylene/propylene copolymer ($\eta$ spec/c.=2.8, determined as defined in Example 1) were dissolved at 100° C. in 1.5 liters of chlorobenzene. After having replaced the air by nitrogen, 30 grams of sebacic acid dichloride were added and 73 grams of chlorine were introduced over a period of 8 hours while irradiating with ultraviolet light. Nitrogen was then blown through the mixture and the polymer was precipitated by pouring the mixture into 3 liters of methanol. After dissolution and precipitation in benzene/methanol the product was found to contain 29.3% of chlorine. The saponification number was 14.3 (mg. KOH/1 gram). When 25 grams of malonyl chloride were used instead of sebacic acid dichloride and 30 grams of chlorine were introduced over a period of 8 hours, a product was obtained containing 13.8% of chlorine and 1.0% of oxygen. The saponification number was then 23.

When instead of malonyl chloride 25 grams of terephthaloyl chloride were used and 55 grams of chlorine were introduced over a period of 6 hours, a polymer was obtained containing 32.8% of chlorine and having a saponification number of 15. In this case, 50 grams of the above copolymer were dissolved in 1 liter of chlorobenzene.

EXAMPLE 6

100 grams of an ethylene/propylene copolymer ($\eta$ spec/c.=3.2, determined as defined in Example 1) were dissolved at 90–100° C. in 2 liters of chlorobenzene. 66 cc. of oxalyl chloride were added to the solution and nitrogen was passed through for 10 minutes. Under the radiation of an ultraviolet lamp, 64 grams of chlorine were introduced over a period of 7 hours at 50 to 60° C. After having distilled off the excess of oxalyl chloride nitrogen was blown through. A sample of the solution was analyzed and 0.05% of hydrolizable chlorine was found, corresponding to 0.54% calculated on the polymer. The carboxychlorinated copolymer contained a total amount of chlorine of 21%.

80 grams of the solution were admixed with 5 cc. of 1 N dibutyl amine solution in chlorobenzene, the mixture was heated for 2 hours on the steam bath, neutralized with alcoholic hydrochloric acid and the polymer was precipitated with methanol. The corresponding dibutyl amide was obtained which was soluble in benzene. It contained 0.21% of nitrogen.

When one drop of ethylene diamine was added to a sample of the chlorobenzenic solution of the carboxychlorinated copolymer, a gel was formed by cross-linkage which could not be cast.

We claim:
1. A process for preparing carboxychlorinated copolymers of unsaturated aliphatic or cycloaliphatic hydrocarbons which comprise reacting a polymer of an unsaturated aliphatic hydrocarbon or a polymer of an unsaturated cycloaliphatic hydrocarbon or a polymer of an unsaturated aliphatic hydrocarbo nand an unsaturated cycloaliphatic hydrocarbon in an organic solvent that is inert towards chlorine under the reaction conditions, at a temperature in the range of 20 to 150°C., with chlorine and at least one agent having a carboxychlorinating action selected from phosgene, dichlorides, or aromatic, cycloaliphatic, araliphatic and aliphatic dicarboxylic acids and mixtures of such agents, in the presence of a free radical catalyst or under the action of radiation rich in energy or ultraviolet light until said carboxychlorinated polymer contains a total amount of chlorine of 10 to 60% by weight of which 0.5 to 2% by weight of hydrolizable chlorine.

2. A process according to claim 1 wherein the carboxychlorinating agent is phosgene, and carbon monoxide is introduced into the reaction mixture to react with the chlorine present to form phosgene in a nascent state.

3. The process of claim 1, wherein oxalyl chloride is used as agent having a carboxychlorinating action.

4. The process of claim 1, wherein a homopolymer of a monoolefin with 2 to 10 carbon atoms, a copolymer of mono-olefins with 2 to 10 carbon atoms, a copolymer of a mono-olefin with 2 to 10 carbon atoms and an aliphatic or cycloaliphatic diene with 4 to 16 carbon atoms is carboxychlorinated.

5. The process of claim 1, wherein polyethylene is carboxychlorinated.

6. The process of claim 1, wherein polypropylene is carboxychlorinated.

7. The process of claim 1, wherein an ethylene/propylene copolymer is carboxychlorinated.

8. A carboxychlorinated polymer of an unsaturated aliphatic hydrocarbon or an unsaturated cycloaliphatic hydrocarbon or copolymer of an unsaturated aliphatic or an unsaturated cycloaliphatic hydrocarbon made by the process of claim 1.

References Cited
UNITED STATES PATENTS 3,445,445  5/1969  Bloch et al. _____ 260—94.9

SAMUEL H. BLECH, Primary Examiner

R. B. TURER, Assistant Examiner

U.S. Cl. X.R.

204—159.18; 260—33.8, 78.5, 80.7, 8.53, 93.1, 93.7, 94.9

PO-1050
(5/69)

UNITED STATES PATENT OFFICE
CERTIFICATE OF CORRECTION

Patent No. 3,536,685　　　　　　Dated October 27, 1970

Inventor(s) Landauer and Beermann

It is certified that error appears in the above-identified patent and that said Letters Patent are hereby corrected as shown below:

In the heading cancel "(both c/o Farbwerk Hoechst AG., Frankfurt am Main, Germany)" and insert therefor--, Assignors to Farbwerke Hoechst Aktiengesellschaft vormals Lucius & Bruning, Frankfurt am Main, Germany--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents